United States Patent
Haseo et al.

(10) Patent No.: US 9,158,615 B2
(45) Date of Patent: Oct. 13, 2015

(54) METHOD AND APPARATUS FOR MANAGING SYSTEM

(71) Applicant: FUJITSU LIMITED, Kawasaki-shi, Kanagawa (JP)

(72) Inventors: Shinji Haseo, Toyoake (JP); Taisuke Aizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 13/898,613

(22) Filed: May 21, 2013

(65) Prior Publication Data
US 2014/0006872 A1  Jan. 2, 2014

(30) Foreign Application Priority Data
Jul. 2, 2012 (JP) .................. 2012-148611

(51) Int. Cl.
*G06F 11/00* (2006.01)
*G06F 11/07* (2006.01)
(52) U.S. Cl.
CPC .......... *G06F 11/079* (2013.01); *G06F 11/0709* (2013.01)
(58) Field of Classification Search
CPC ...................................... G06F 11/07
USPC ................. 714/37, 39, 40, 42, 47.1
See application file for complete search history.

(56) References Cited

U.S. PATENT DOCUMENTS

| 6,604,208 | B1 * | 8/2003 | Gosselin et al. .............. 714/4.12 |
| 7,027,981 | B2 * | 4/2006 | Bizjak ........................... 704/225 |
| 7,218,611 | B2 * | 5/2007 | Mimura et al. ................ 370/241 |
| 7,506,195 | B2 * | 3/2009 | Takahashi et al. ............. 714/4.4 |
| 2002/0111755 | A1 * | 8/2002 | Valadarsky et al. ............. 702/58 |

FOREIGN PATENT DOCUMENTS

WO  WO 2004/061681 A1   7/2004

* cited by examiner

*Primary Examiner* — Dieu-Minh Le
(74) *Attorney, Agent, or Firm* — Oblon, McClelland, Maier & Neustadt, L.L.P.

(57) ABSTRACT

A disclosed method includes: upon detecting an abnormal condition occurred in a system in which a certain command was executed, extracting one or plural commands executed within a predetermined time before the abnormal condition occurred, from among commands affecting a state of the system and executed in the system; upon detecting that a first command is inputted by a user, determining whether or not a command that matches the first command has been extracted; and upon determining that the command that matches the first command has been extracted, outputting display data representing there is a possibility that an abnormal condition occurs.

15 Claims, 9 Drawing Sheets

| OPERATION ID | OPERATION RESULT | COMMAND ID | COMMAND BODY | PARAMETER | DATE AND TIME | EXECUTION DESTINATION HOST |
|---|---|---|---|---|---|---|
| GRP1 | SUCCESS | 1 | stopA | -a ABC | 2012/2/1 10:11 | hostA |
| GRP1 | SUCCESS | 2 | stopB | -b -x | 2012/2/1 10:13 | hostA |
| GRP1 | SUCCESS | 3 | stopC | -c -y | 2012/2/1 10:15 | hostA |
| ... | ... | ... | ... | ... | ... | ... |
| GRP2 | FAILURE | 1 | stopA | -a XYZ | 2012/2/2 11:23 | hostA |
| GRP2 | FAILURE | 2 | stopC | -c | 2012/2/2 11:24 | hostA |
| ... | ... | ... | ... | ... | ... | ... |

FIG.2

| COMMAND BODY | PARAMETER | OPERATION SUCCESS | OPERATION FAILURE |
|---|---|---|---|
| stopC | -c -y | GRP2 | GRP1 |
| ⋮ | ⋮ | ⋮ | ⋮ |

FIG.3

| COMMAND BODY | PARAMETER |
|---|---|
| ls | -l |
| cd | |
| ls | -a |
| ⋮ | ⋮ |

FIG.4

METHOD AND APPARATUS FOR MANAGING SYSTEM

CROSS-REFERENCE TO RELATED APPLICATIONS

This application is based upon and claims the benefit of priority of the prior Japanese Patent Application No. 2012-148611, filed on Jul. 2, 2012, the entire contents of which are incorporated herein by reference.

FIELD

This invention relates to a system management technique.

BACKGROUND

In a large-scale complex system, a management cost of the system is increasing. A manager of the system inputs various commands in order to carry out the management of the system, however, the manager who is not familiar with the system may not become aware that an input command badly influences the system. Then, when the input command is not appropriate, an error occurs in the system, and recovery operations or the like should be carried out for the system.

There is a technique for detecting a trouble by determining whether or not an event that occurs in the system matches definition manually registered in advance. However, according to this technique, when any event that has not been registered occurs, it is impossible to detect the trouble. Therefore, an operator cannot recognize that there is a possibility that the trouble occurs, and may carry out any operation that causes the trouble, erroneously. Moreover, because the event is manually registered, there is a problem that the load of the system manager is large.

SUMMARY

In other words, the conventional art cannot prevent from erroneously executing commands that may cause any abnormal condition.

An information processing method that is one mode of the embodiments include: (A) upon detecting an abnormal condition occurred in a system in which a certain command was executed, extracting one or plural commands executed within a predetermined time before the abnormal condition occurred, from among commands affecting a state of the system and executed in the system; (B) upon detecting that a first command is inputted by a user, determining whether or not a command that matches the first command has been extracted; and (C) upon determining that the command that matches the first command has been extracted, outputting display data representing there is a possibility that an abnormal condition occurs.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of data stored in an execution history storage unit;

FIG. 3 is a diagram depicting an example of data stored in a pattern storage unit;

FIG. 4 is a diagram depicting an example of data stored in a reference command storage unit;

DESCRIPTION OF EMBODIMENTS

Figure 1:
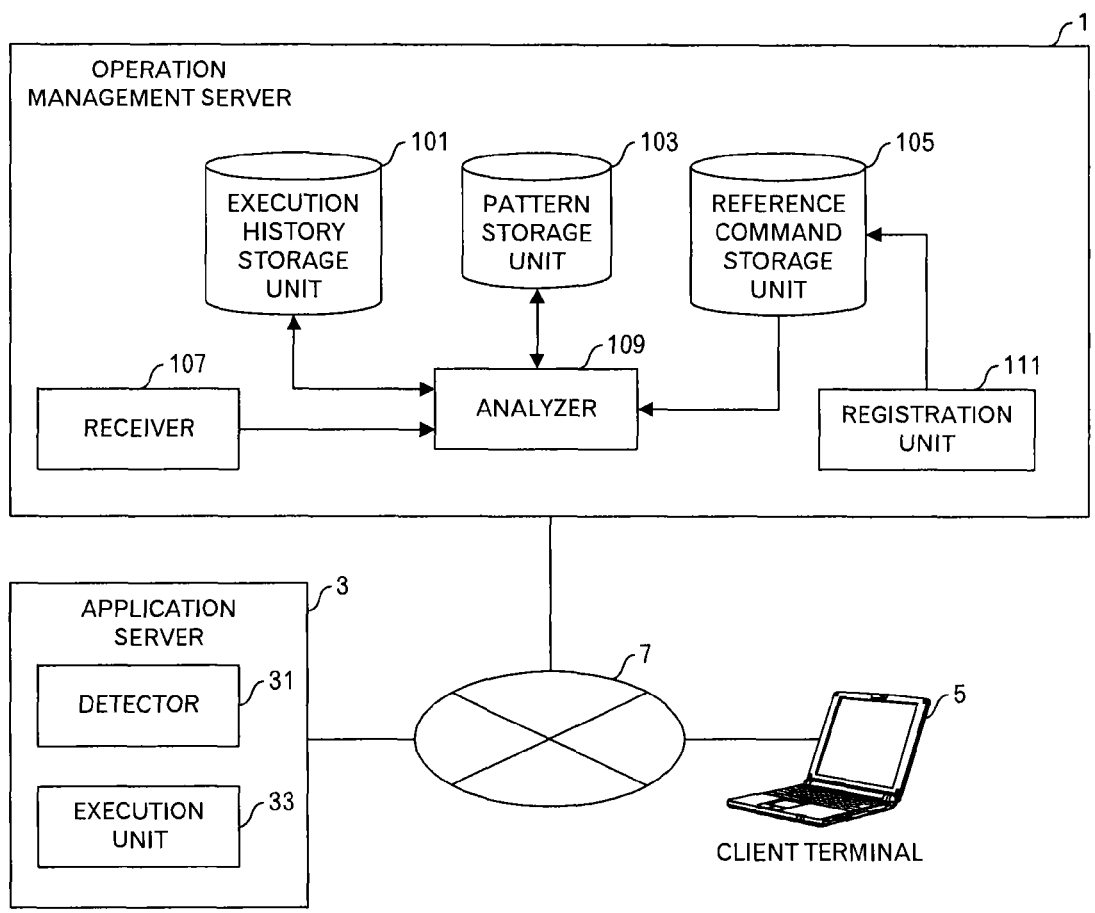
FIG. 1 is a diagram depicting a system outline of an embodiment.

FIG. 1 illustrates an outline of a system relating to this embodiment. For example, an operation management server 1 that performs a main processing in this embodiment, an application server 3 and a client terminal 5 are connected with a network 7 that is a Local Area Network (LAN), for example.

A user inputs a command through an input device (e.g. key board) of the client terminal 5. The inputted command is a command to be executed in the application server 3, however, in this embodiment, the client terminal 5 firstly transmits the command to the operation management server 1. The operation management server 1 receives the command, performs a processing that will be explained in the following, and transmits the command to the application server 3, when causing the application server 3 to execute the command.

The operation management server 1 includes an execution history storage unit 101, a pattern storage unit 103, a reference command storage unit 105, a receiver 107, an analyzer 109 and a registration unit 111.

The receiver 107 receives an abnormal condition notification from the application server 3, and outputs the abnormal condition notification to the analyzer 109. The analyzer 109 receives the abnormal condition notification from the receiver 107, and performs a processing for storing a command into a pattern storage unit 103 and the like. Moreover, the analyzer 109 receives the command from the client terminal 5, performs a processing using data stored in the execution history storage unit 101, data stored in the pattern storage unit 103 and data stored in the reference command storage unit 105, and stores the processing results into the execution history storage unit 101 and pattern storage unit 103. The registration unit 111 receives the reference command that will be explained later from the client terminal 5, and registers the reference command storage unit 105.

The application server 3 includes a detector 31 and an execution unit 33. The detector 31 detects that an abnormal condition caused by executing a command occurred, and sends the abnormal condition notification to the operation management server 1. Moreover, the detector 31 transmits information concerning states of the system before and after the execution of the command (e.g. information concerning life and death of a process or the like) to the operation management server 1. The execution unit 33 receives a command from the operation management server 1, and executes the command.

FIG. 2 illustrates an example of data stored in the execution history storage unit 101. In an example of FIG. 2, an operation ID, an operation result, a command identifier (ID), a command body, a parameter, a execution date and time of a command, information concerning an execution destination host are stored. The execution history storage unit 101 stores only execution history of commands that were determined not to be a reference command (i.e. update command) and does not store the execution history of the reference commands.

The reference commands is a command that does not affect the state of the system, and is "1s", "cd" or the like in UNIX (registered trademark), for example. Moreover, the update command is a command that affects the state of the system, and is "stop", "rm", "cp" or the like in UNIX (registered trademark), for instance.

Thus, the reason why only the execution history of the update commands is registered in the execution history storage unit 101 is as follows: Even when the same operation is made, various input patterns of the commands exist. Therefore, when it is determined whether or not there is a possibility that any abnormal condition occurs, only the update command that is a core of operations is used, and the reference command that is a noise is eliminated. For example, when an operation to stop process A is conducted, commands such as "cd/opt/A/", "1s -1" and "stopA -a xyz" may be inputted, or commands such as "/opt/A/stopA -a xyz" may be inputted, or commands "cd/opt/A" and "stopA -abc xyz" may be inputted. In such a case, the command "stopA" that is the update command, which is a core of the operations, is registered in the execution history storage unit 101.

Moreover, as described in the aforementioned example, there are a lot of cases where substantially the same operation is performed, even if parameters are somewhat different. Therefore, in case where a notification informing that there is a possibility that any abnormal condition occurs is sent only when the parameters completely match, it is likely to miss a command having a possibility that the abnormal condition occurs, although the parameters are somewhat different. Therefore, in this embodiment, it is determined whether or not the parameters match, by considering the similarity of the parameters as described below.

FIG. 3 illustrates an example of data stored in the pattern storage unit 103. In an example of FIG. 3, a command body, parameters, an operation ID of an operation, which was successfully executed, among operations including the execution of that command, an operation ID of an operation, which was failed, among operations including the execution of that command are stored. The pattern storage unit 103 stores commands, which were executed within a predetermined time (e.g. 10 minutes) before the abnormal condition occurs. Plural operation IDs may be stored in columns of the operation ID of the operation, which was successfully executed, and the operation ID of the operation, which was failed.

FIG. 4 illustrates an example of data stored in the reference command storage unit 105. In an example of FIG. 4, a command body of the reference command, and a parameter are stored.

Next, operations of the system illustrated in FIG. 1 will be explained by using FIGS. 5 to 9.

Firstly, when the client terminal 5 accepts an input of a command from a user, the client terminal 5 transmits the inputted command to the operation management server 1. When the analyzer 109 of the operation management server 1 receives the command inputted by the user from client terminal 5 (hereinafter, referred to input command) (FIG. 5: step S1), the analyzer 109 stores the input command in a storage unit such as a main memory.

Then, the analyzer 109 performs a determination processing (step S3). The determination processing will be explained by using FIG. 6.

Figure 6:
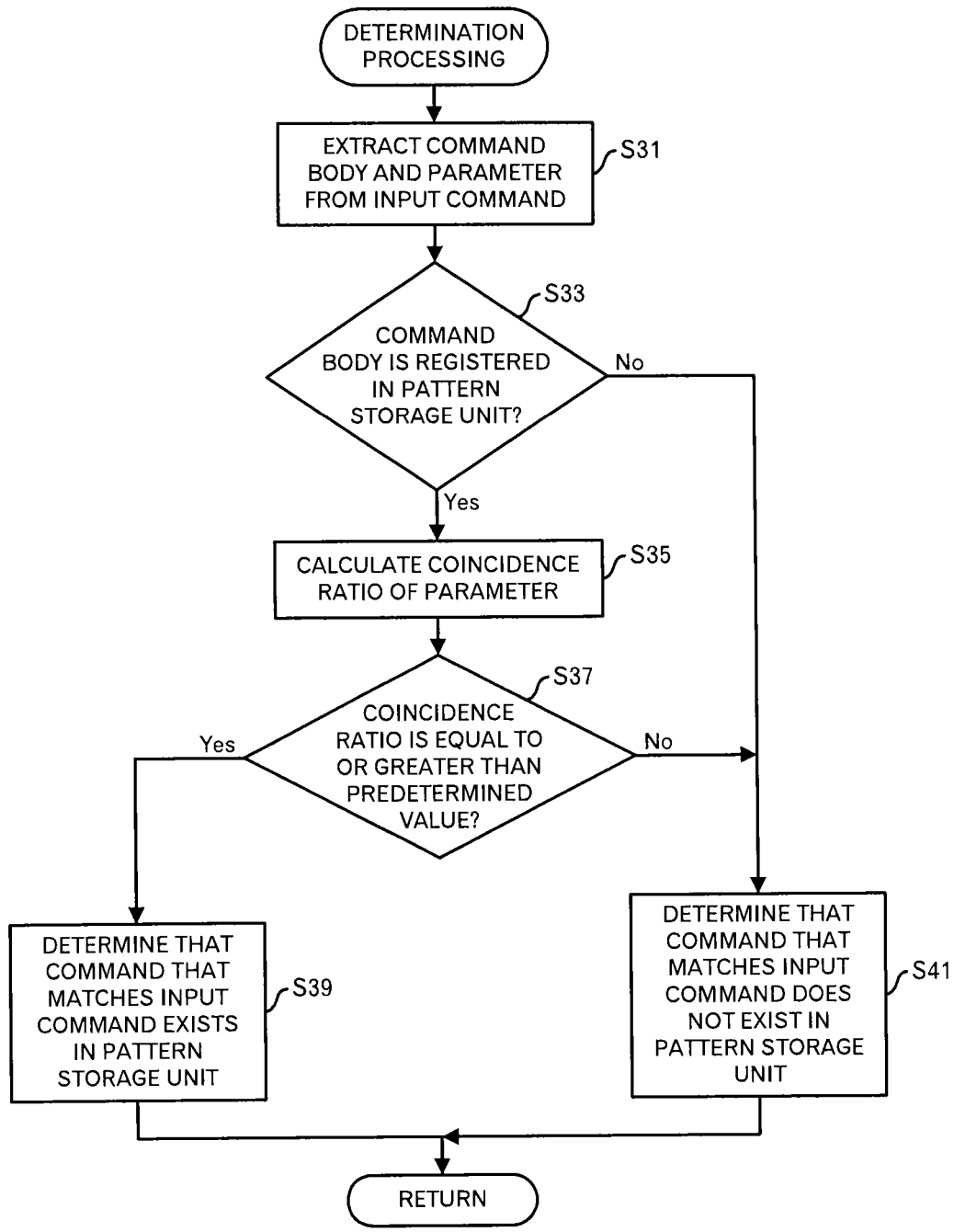
FIG. 6 is a diagram depicting a processing flow of a determination processing.

Firstly, the analyzer 109 extracts a command body and a parameter from the input command (FIG. 6: step S31).

The analyzer 109 determines whether or not the command body extracted at the step S31 is stored in the pattern storage unit 103 (step S33). When it is determined that the command body is not stored in the pattern storage unit 103 (step S33: No route) the analyzer 109 determines that no command that matches the input command is stored in the pattern storage unit 103 (step S41).

On the other hand, when it is determined that the command body is stored in the pattern storage unit 103 (step S33: Yes route), the analyzer 109 calculates a coincidence ratio (i.e. similarity) between a parameter stored in correlation with the command body in the pattern storage unit 103 and the parameter extracted at the step S31 (step S35). As for the similarity, a typical method to calculate the similarity between two character strings is employed. Such a method is well-known, therefore, the detailed explanation is omitted here.

When the coincidence ratio of the parameters is a predetermined value (e.g. 50%) or more (step S37: Yes route), the analyzer 109 determines that the command that matches the input command exists in the pattern storage unit 103 (step S39). On the other hand, when the coincidence ratio between the parameters is less than the predetermined value (step S37: No route), the processing shifts to the step S41. Then, the processing returns to the calling-source processing.

By carrying out the aforementioned processing, even when the parameters are somewhat different, the command that can be regarded as the substantially the same command is not missed.

Figure 5:
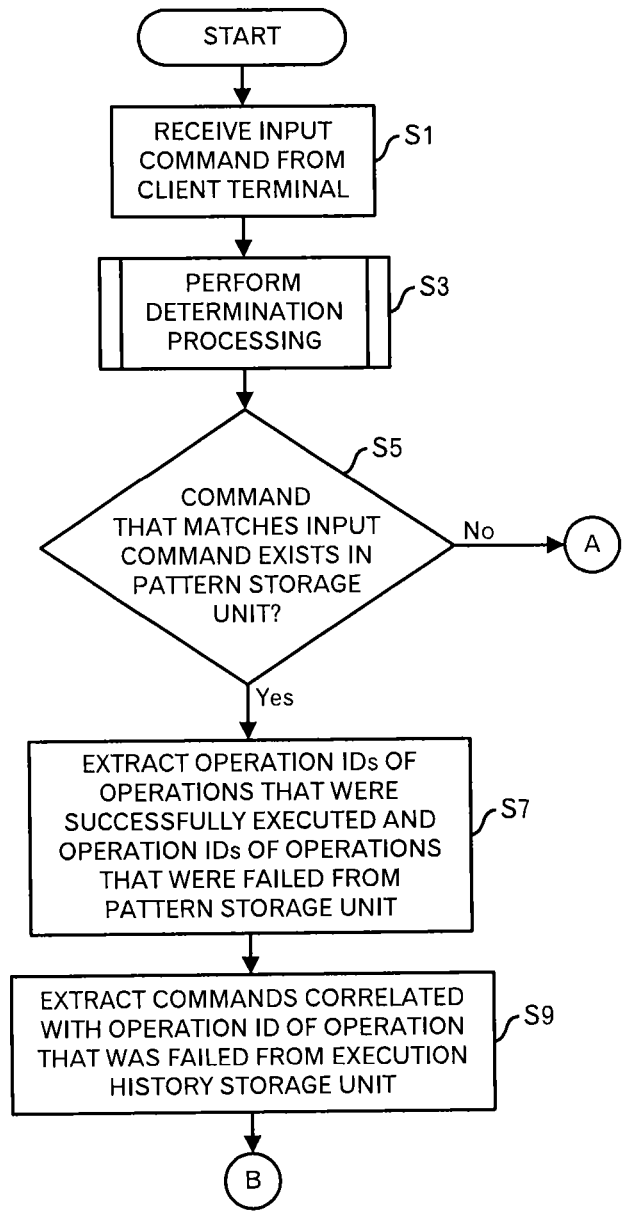
FIG. 5 is a diagram depicting a main processing flow.

Returning to the explanation of FIG. 5, the analyzer 109 determines whether or not there is a command that matches the input command in the pattern storage unit 103 (step S5). When the processing passed through the step S41, in other words, when it is determined that there is no command that matches the input command in the pattern storage unit 103 (step S5: No route), the processing shifts to step S23 in FIG. 7 through terminal A.

On the other hand, when the processing passed through the step S39, in other words, when it is determined that there is a command that matches the input command in the pattern storage unit 103 (step S5: Yes route), the analyzer 109 extracts an operation ID of an operation, which was successfully executed, and an operation ID of an operation, which was failed, which are correlated with the command that matches the input command, from the pattern storage unit 103 (step S7).

The analyzer 109 extracts commands correlated with the extracted operation ID of the operation, which was failed, from the execution history storage unit 101 (step S9). The processing shifts to step S11 in FIG. 7 through terminal B.

Figure 7:
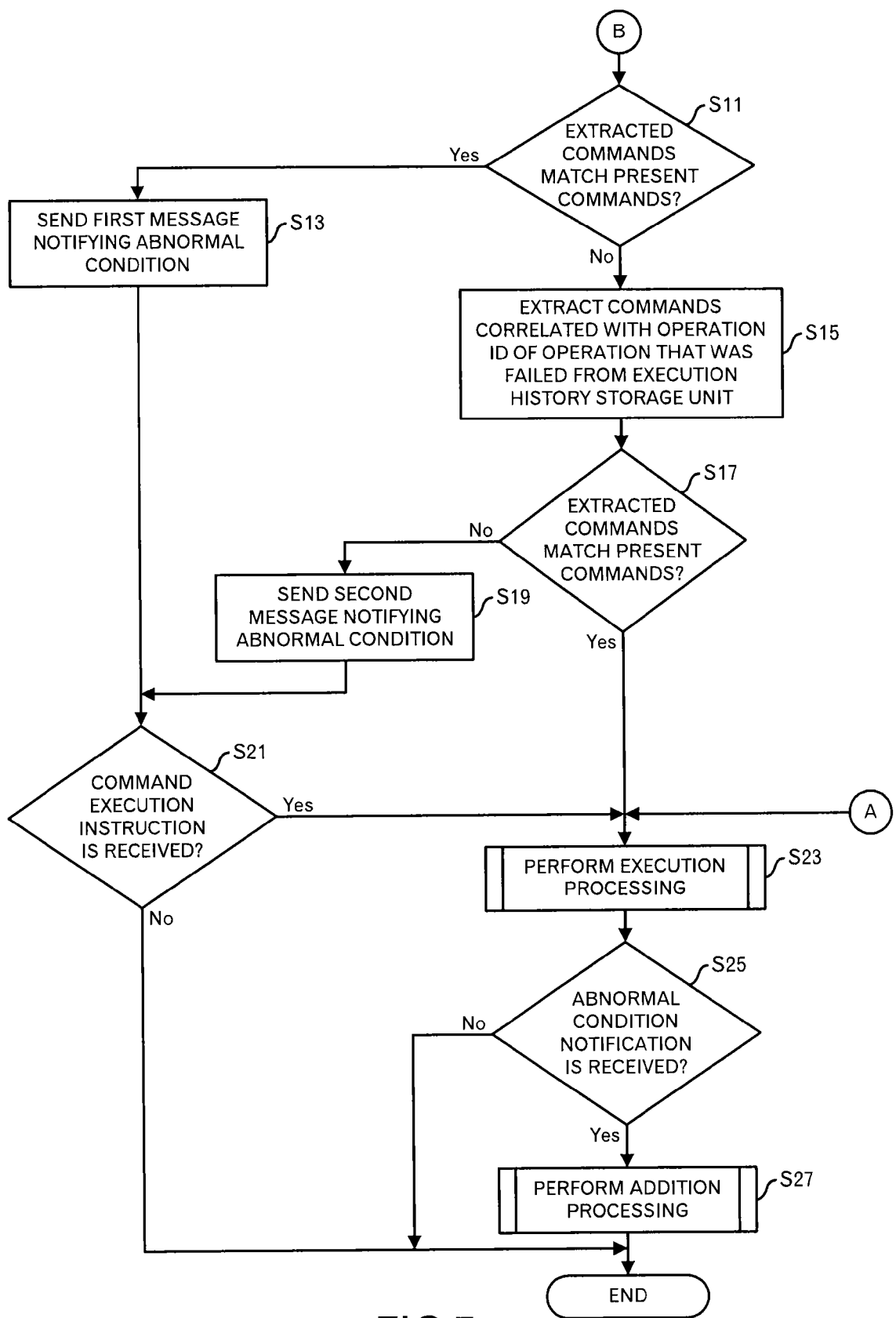
FIG. 7 is a diagram depicting the main processing flow.

Shifting to the explanation of FIG. 7, the analyzer 109 determines whether or not the commands extracted at the step S9 match the present commands (step S11). The present commands include the input command and commands executed within the predetermined time before the execution of the input command. The latter is extracted from the execution history storage unit 101.

When the extracted commands match the present commands (step S11: Yes route), the analyzer 109 transmits a first message representing there is a possibility that the abnormal condition occurs when the input command is executed, to the client terminal 5 (step S13). Then, the processing shifts to a processing at step S21.

On the other hand, when the extracted commands do not match the present commands (step S11: No route), the analyzer 109 extracts commands correlated with the extracted operation ID of the operation, which was successfully executed, from the execution history storage unit 101 (step S15).

The analyzer 109 determines whether or not the commands extracted at the step S15 match the present commands (step S17).

When the extracted commands do not match the present commands (step S17: No route), the analyzer 109 transmits a second message representing a possibility that the abnormal condition occurs when the input command is executed to the client terminal 5 (step S19). Because the present commands do not match the commands of the operation that was successfully executed, there is a possibility that the present operation is failed.

After the step S13 or S19, the analyzer 109 determines whether or not a command execution instruction is received from the client terminal 5 (step S21). The command execution instruction is transmitted from the client terminal 5 to the operation management server 1, when the user of the operation terminal 5 that received the first or second message instructs the client terminal 5 to execute the input command.

The command execution instruction is not received (step S21: No route), the input command is not executed, and the processing ends.

On the other hand, when the command execution instruction is received (step S21: Yes route) or the extracted commands match the present commands (step S17: Yes route), the analyzer 109 performs an execution processing (step S23). The execution processing will be explained by using FIG. 8.

Figure 8:
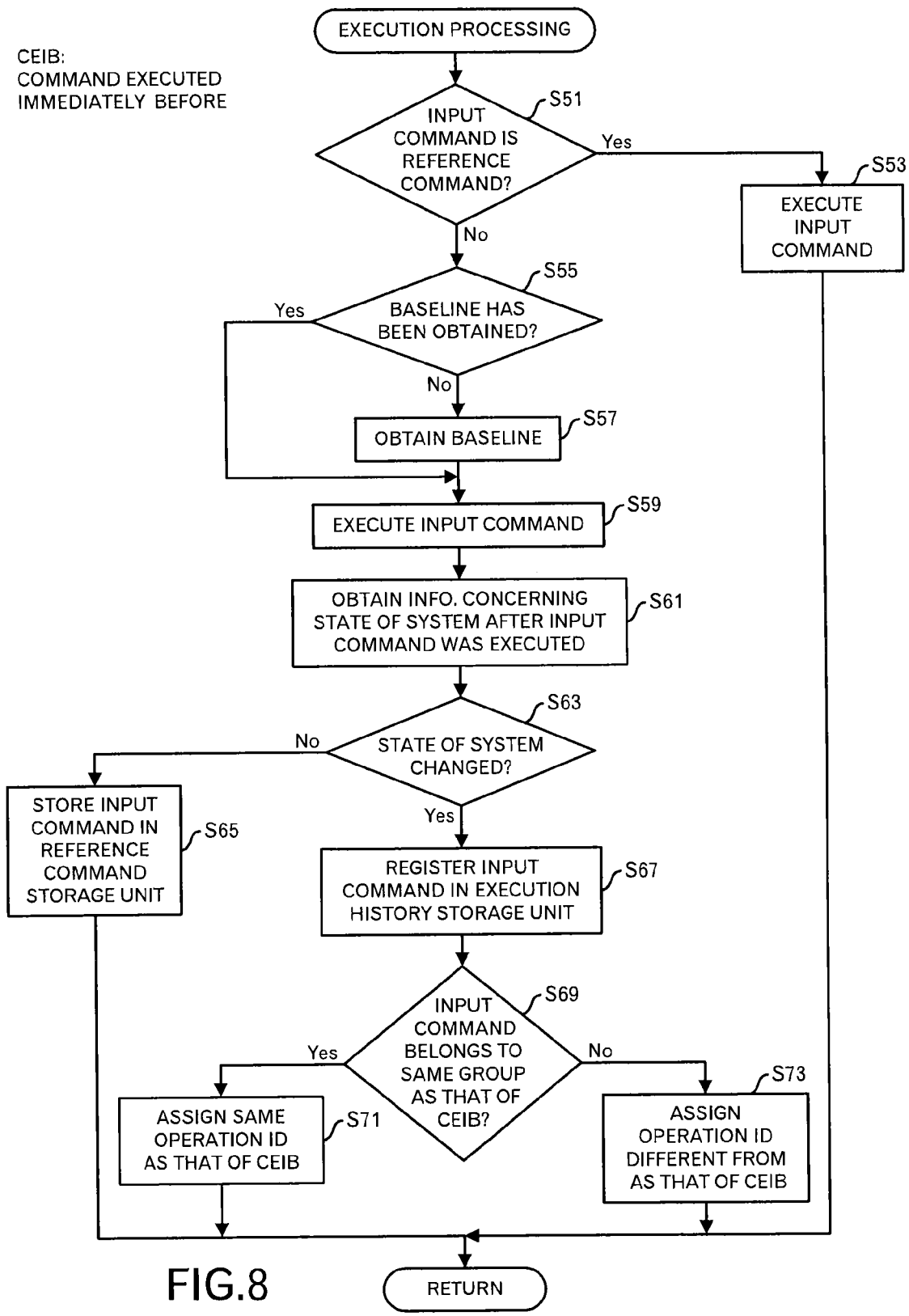
FIG. 8 is a diagram depicting a processing flow of an execution processing.

Firstly, the analyzer 109 determines whether or not the command that matches the input command is stored in the reference command storage unit 105. Namely, the analyzer 109 determines whether or not the input command is the reference command (FIG. 8: step S51).

When the input command is the reference command (step S51: Yes route), the analyzer 109 transmits the command execution instruction including the input command to the application server 3. In response to receipt of the command execution instruction, the execution unit 33 in the application server 3 executes the input command (step S53).

On the other hand, when the input command is not the reference command (step S51: No route), there is a possibility that the input command influences the state of the system. Therefore, the analyzer 109 determines whether or not a baseline has been obtained (step S55). The baseline is information representing the state of the system before the execution of the input command.

When the baseline has been obtained (step S55: Yes route), there is no need to obtain the baseline. Therefore, the processing shifts to a processing of step S59. On the other hand, when the baseline has not been obtained (step S55: No route), the analyzer 109 transmits an obtaining request of the baseline to the application server 3. In response to this obtaining request, the detector 31 in the application server 3 transmits the baseline to the operation management server 1. Thus, the analyzer 109 obtains the baseline (step S57).

Then, the analyzer 109 transmits the command execution instruction including the input command to the application server 3. In response to the command execution instruction, the execution unit 33 in the application server 3 executes the input command (step S59).

The analyzer 109 obtains information representing the state of the system after the execution of the input command from the application server 3 (step S61).

The analyzer 109 determines whether or not the state of the system changed, by calculating difference between states before and after the execution of the input command, by using the baseline and the information obtained at the step S61 (step S63).

When the state of the system does not change (step S63: No route), the input command is the reference command, so the analyzer 109 stores the input command in the reference command storage unit 105 (step S65).

On the other hand, when the state of the system changed (step S63: Yes route), the input command is the update command, so and the analyzer 109 stores the execution history data including the input command in the execution history storage unit 101 (step S67). At the step S67, the command body, parameter, date and time and execution destination host are stored. Moreover, at the processing time of the step S67, "success" is stored as the operation result.

The analyzer 109 determines whether or not the input command belongs to the same operation as that of the command executed immediately before the input command (step S69). At the step S69, for example, it is determined whether or not a predetermined time (e.g. 10 minutes) has passed since the execution of the command executed immediately before.

When the input command belongs to the same operation as that of the command executed immediately before the input command (step S69: Yes route), the analyzer 109 assigns the same operation ID as that of the command executed immediately before the input command to the input command (step S71). At the step S71, the operation ID and command ID are stored in the execution history storage unit 101 for the input command. Then, the processing returns to the calling-source processing.

On the other hand, when the input command does not belong to the same operation as that of the command executed immediately before the input command (step S69: No route), the analyzer 109 assigns an operation ID different from that of the command executed immediately before the input command to the input command (step S73). At the step S73, the operation ID and command ID are stored in the execution history storage unit 101 for the input command. Then, the processing returns to the calling-source processing.

By carrying out the aforementioned processing, it is determined at the execution of the input command whether the input command is either the reference command or the update command, and the determination result for the input command is registered to be used when the same command is executed again.

Returning to the explanation of FIG. 7, the analyzer 109 determines whether or not an abnormal condition notification was received from the application server 3 that executed the input command (step S25). When the abnormal condition notification is not received (step S25: No route), there is no need to add any pattern. Therefore, the processing ends.

On the other hand, when the abnormal condition notification was received (step S25: Yes route), the analyzer 109 performs an addition processing (step S27). The addition processing will be explained by using FIG. 9. The abnormal condition notification includes information concerning the date and time when the abnormal condition occurred and the executed command.

Figure 9:
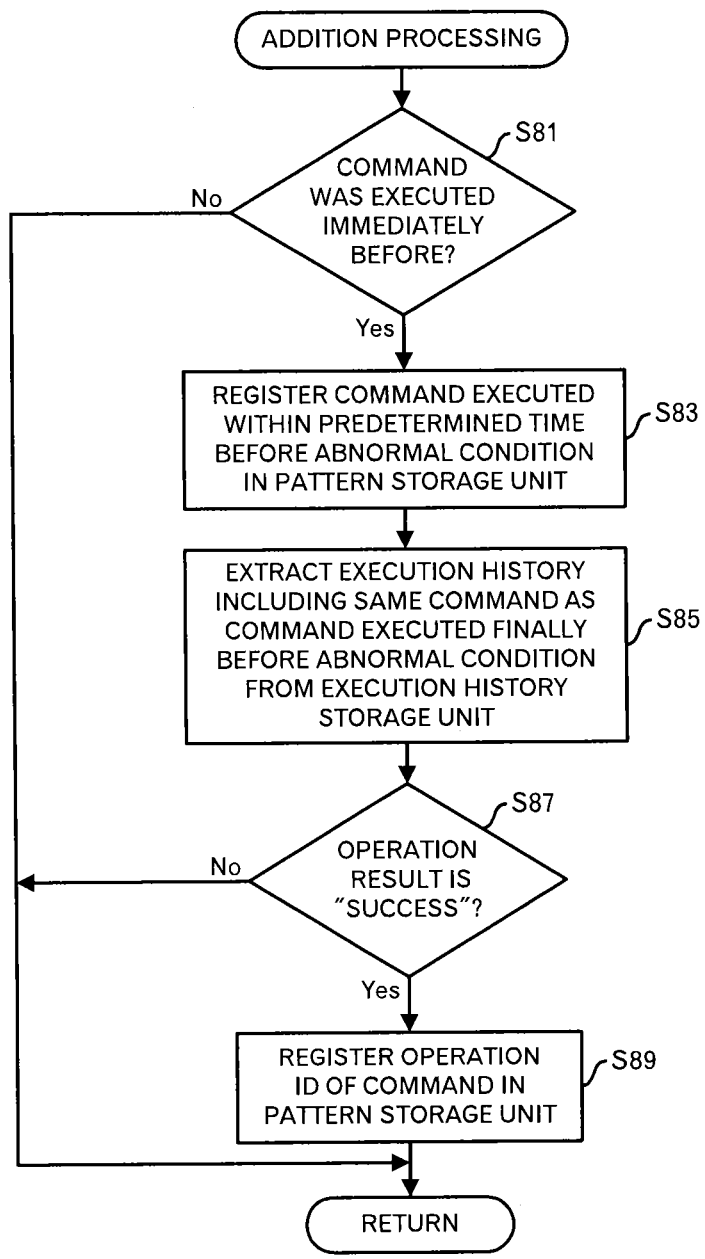
FIG. 9 is a diagram depicting a processing flow of an addition processing.

Firstly, the analyzer 109 refers to the column of the date and time in the execution history storage unit 101 to determines whether or not any command is executed before the abnormal condition occurs (e.g. within 5 minutes before the abnormal condition occurs) (FIG. 9: step S81).

When no command before the abnormal condition occurred is executed (step S81: No route), there is a possibility that there is no cause-and-effect relation between the abnormal condition and the execution of the command. Therefore, the processing returns to the calling-source processing.

On the other hand, when a command before the abnormal condition occurred was executed (step S81: Yes route), the analyzer 109 extracts the command executed within a predetermined time (e.g. 10 minutes) before the abnormal condition occurred from the execution history storage unit 101, and registers the extracted command into the pattern storage unit 103 (step S83). At the step S83, the operation ID of the registered command is stored in the column of the operation, which was failed. Moreover, at the step S83, the operation result is changed to "failure" for the command executed within the predetermined time before the abnormal condition occurred in the execution history storage unit 101.

The analyzer 109 extracts the execution history data including the same command as the command executed finally before the abnormal condition occurred from the execution history storage unit 101 (step S85).

The analyzer 109 determines whether or not the operation result for the same command as the command executed finally before the abnormal condition occurred represents "success" (step S87).

When the operation result does not represent "success" (step S87: No route), the processing returns to the calling-source processing. On the other hand, when the operation result represents "success" (step S87: Yes route), the analyzer 109 registers the operation ID of the command in the column of the operation, which is successfully executed, in the pattern storage unit 103 (step S89). When plural cases for the execution history data are extracted at the step S85, the steps S87 and S89 are executed for each case for the execution history data. Then, the processing ends.

Returning to the explanation of FIG. 7, after the addition processing, the processing ends.

By carrying out the aforementioned processing, it is possible to prompt a user to pay attention before the execution of the command that may cause any abnormal condition. Therefore, it is possible to prevent from causing any trouble in the system. Moreover, even when the input command does not coincide with the commands of the operation that was successfully executed, the message notifying the abnormal condition is sent to the user. Therefore, the number of cases where the command that is a cause of the abnormal condition is missed becomes lesser.

Although the embodiments of this invention were explained, this invention is not limited to the embodiments. For example, functional block diagrams of the aforementioned operation management server 1, application server 3 and client terminal 5 do not always correspond to program module configurations.

Moreover, table structures of the aforementioned tables are mere examples, and are not always employed as they are. Furthermore, as for the processing flow, as long as the processing result does not change, an order of the steps may be changed. Furthermore, plural steps may be executed in parallel.

At the step S85, only a command executed finally before the abnormal condition occurred is processed. However, all of the commands registered at the step S83 may be processed.

Figure 10:
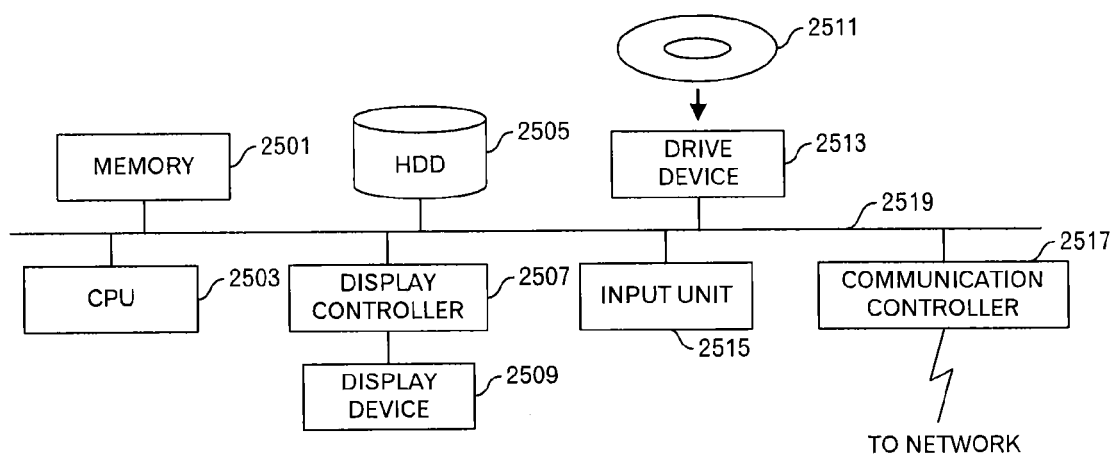
FIG. 10 is a functional block diagram of a computer.

In addition, the aforementioned operation management server 1, application server 3 and client terminal 5 are computer devices as illustrated in FIG. 10. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 10. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments of this invention are outlined as follows:

An information processing method relating to the embodiments includes: (A) upon detecting an abnormal condition in a system in which a certain command was executed, extracting a command executed within a predetermined time before the abnormal condition occurred, from a first data storage unit storing information concerning commands affecting a state of the system among commands executed in the system, and storing the extracted command into a second data storage unit; (B) upon detecting that a first command is inputted by a user, determining whether or not a command that matches the first command is stored in the second data storage unit; and (C) upon determining that the command that matches the first command is stored, outputting display data representing there is a possibility that an abnormal condition occurs.

According to this configuration, because the command that may be a cause of the abnormal condition is automatically registered without omission, it becomes possible to prevent from executing such a command erroneously.

Moreover, the aforementioned first data storage unit may store, for each operation that was performed for the system, information concerning a command affecting a state of the system among commands that were executed in the operation. In such a case, the extracting and storing may include: (a1) extracting a command executed in a predetermined time before the abnormal condition occurred and identification information of an operation in which that command was executed, and storing the extracted command in correlation with the extracted identification information in the second data storage unit. In addition, the outputting may include (c1) extracting, from the second data storage unit, identification information of an operation, which is stored in correlation with a command that matches the first command; (c2) determining whether or not a first command group including the first command and commands that were executed within a predetermined time before the first command match second commands identified by the extracted identification information; (c3) upon determining that the command that matches the first command is stored and the first command group matches the second commands, outputting the display data. Thus, after the user recognizes there is a possibility that the abnormal condition occurs, it is determined whether or not the first command is executed.

Moreover, the aforementioned first data storage unit may store, for each operation executed for the system, information concerning a command affecting a state of the system among commands executed in the operation and information concerning whether or not the abnormal condition occurred due to the operation. In such a case, the extracting and storing may include (a2) extracting, from the first data storage unit, identification information of an operation in which an abnormal condition does not occur among operations in which the same command as the command executed immediately before the abnormal condition occurred, and storing the extracted identification information in the second data storage unit in correlation with the command executed immediately before the abnormal condition occurred. In addition, the outputting may include: (c4) extracting, from the second data storage unit, identification information of an operation in which an abnormal condition does not occur, wherein the identification information is stored in the second data storage unit in correlation with the command that matches the first command; (c5) determining whether or not a first command group including the first command and commands that were executed within a predetermined time before the first command match third commands identified by the extracted identification information; (c6) upon determining that the command that matches the first command is stored and the first command group does not match the third commands, outputting the display data. When the first command does not match commands relating to the operation that was performed normally, there is a possibility that the abnormal condition occurs. Therefore, by executing the aforementioned processing, it is possible to prevent from executing the first command through the abnormal condition may occur.

Furthermore, the information processing method may further include: (D) upon determining that the command that matches the first command is not stored, determining whether or not the first command is stored in a third data storage unit storing commands that do not affecting the system; (E) upon determining that the first command is not stored in the third data storage unit, obtaining first information representing a state of the system before the first command is executed; (F) after the first command was executed in the system, obtaining second information representing a state of the system after the first command was executed; and (G) upon determining, based on the obtained first and second information, that the state of the system changed, storing information concerning the first command in the first data storage unit. The commands include a command affecting the state of the system and a command that does not affect the state of the system, and the cause of the abnormal condition is limited to the former. Therefore, as described above, it is possible to appropriately identify the command that may be a cause of the abnormal condition.

Moreover, the determining may include: (b1) determining whether or not a command whose command body is identical to a command body of the first command and having a parameter whose similarity with a parameter of the first command is equal to or greater than a predetermined value has been extracted. Thus, it becomes possible to improve the accuracy of the determination.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:

upon detecting an abnormal condition occurred in a system in which a certain command was executed, extracting one or plural commands executed within a predetermined time before the abnormal condition occurred, from among commands affecting a state of the system and executed in the system;

upon detecting that a first command is inputted by a user, determining whether or not a command that matches the first command has been extracted; and upon determining that the command that matches the first command has been extracted, outputting display data representing there is a possibility that an abnormal condition occurs.

2. The computer-readable, non-transitory storage medium as set forth in claim 1, wherein the outputting comprises:

extracting identification information of an operation in which an abnormal condition occurred from among operations in which the command that matches the first command was executed;

determining whether or not a first command group including the first command and a command executed within a second predetermined time before the first command was executed matches a second commands identified by the extracted identification information; and upon determining that the first command group matches the second commands, outputting the display data.

3. The computer-readable, non-transitory storage medium as set forth in claim 1, wherein the outputting comprises:

extracting identification information of an operation in which an abnormal condition does not occur from among operations in which the command that matches the first command was executed;

determining whether or not a first command group including the first command and a command executed within a third predetermined time before the first command was executed matches a third commands identified by the extracted identification information; and upon determining that the first command group does not match the third commands, outputting the display data.

4. The computer-readable, non-transitory storage medium as set forth in claim 1, wherein the process further comprises:

upon determining that the command that matches the first command has not been extracted, determining whether or not the first command is a command that does not affect the system;

upon determining that the first command is the command that does not affect the system, obtaining first information representing a state of the system before the first command is executed;

upon detecting that the first command was executed in the system, obtaining second information representing a state of the system after the first command was executed; and upon determining, based on the first information and the second information, that the state of the system changed, determining that the first command is a command that affects the system.

5. The computer-readable, non-transitory storage medium as set forth in claim 1, wherein the determining comprises:
   determining whether or not a command whose command body is identical to a command body of the first command and having a parameter whose similarity with a parameter of the first command is equal to or greater than a predetermined value has been extracted.

6. An information processing method, comprising:
   upon detecting an abnormal condition occurred in a system in which a certain command was executed, extracting, by using a computer, one or plural commands executed within a predetermined time before the abnormal condition occurred, from among commands affecting a state of the system and executed in the system;
   upon detecting that a first command is inputted by a user, determining, by using the computer, whether or not a command that matches the first command has been extracted; and
   upon determining that the command that matches the first command has been extracted, outputting, by using the computer, display data representing there is a possibility that an abnormal condition occurs.

7. The information processing method as set forth in claim 6, wherein the outputting comprises:
   extracting identification information of an operation in which an abnormal condition occurred from among operations in which the command that matches the first command was executed;
   determining whether or not a first command group including the first command and a command executed within a second predetermined time before the first command was executed matches a second commands identified by the extracted identification information; and
   upon determining that the first command group matches the second commands, outputting the display data.

8. The information processing method as set forth in claim 6, wherein the outputting comprises:
   extracting identification information of an operation in which an abnormal condition does not occur from among operations in which the command that matches the first command was executed;
   determining whether or not a first command group including the first command and a command executed within a third predetermined time before the first command was executed matches a third commands identified by the extracted identification information; and
   upon determining that the first command group does not match the third commands, outputting the display data.

9. The information processing method as set forth in claim 6, further comprising:
   upon determining that the command that matches the first command has not been extracted, determining whether or not the first command is a command that does not affect the system;
   upon determining that the first command is the command that does not affect the system, obtaining first information representing a state of the system before the first command is executed;
   upon detecting that the first command was executed in the system, obtaining second information representing a state of the system after the first command was executed; and
   upon determining, based on the first information and the second information, that the state of the system changed, determining that the first command is a command that affects the system.

10. The information processing method as set forth in claim 6, wherein the determining comprises:
    determining whether or not a command whose command body is identical to a command body of the first command and having a parameter whose similarity with a parameter of the first command is equal to or greater than a predetermined value has been extracted.

11. An information processing apparatus, comprising:
    a memory; and
    a processor configured to use the memory to execute a process, the process comprising:
       upon detecting an abnormal condition occurred in a system in which a certain command was executed, extracting one or plural commands executed within a predetermined time before the abnormal condition occurred, from among commands affecting a state of the system and executed in the system;
       upon detecting that a first command is inputted by a user, determining whether or not a command that matches the first command has been extracted; and
       upon determining that the command that matches the first command has been extracted, outputting display data representing there is a possibility that an abnormal condition occurs.

12. The information processing apparatus as set forth in claim 11, wherein the outputting comprises:
    extracting identification information of an operation in which an abnormal condition occurred from among operations in which the command that matches the first command was executed;
    determining whether or not a first command group including the first command and a command executed within a second predetermined time before the first command was executed matches a second commands identified by the extracted identification information; and
    upon determining that the first command group matches the second commands, outputting the display data.

13. The information processing apparatus as set forth in claim 11, wherein the outputting comprises:
    extracting identification information of an operation in which an abnormal condition does not occur from among operations in which the command that matches the first command was executed;
    determining whether or not a first command group including the first command and a command executed within a third predetermined time before the first command was executed matches a third commands identified by the extracted identification information; and
    upon determining that the first command group does not match the third commands, outputting the display data.

14. The information processing apparatus as set forth in claim 11, wherein the process further comprises:
    upon determining that the command that matches the first command has not been extracted, determining whether or not the first command is a command that does not affect the system;
    upon determining that the first command is the command that does not affect the system, obtaining first information representing a state of the system before the first command is executed;

upon detecting that the first command was executed in the system, obtaining second information representing a state of the system after the first command was executed; and upon determining, based on the first information and the second information, that the state of the system changed, determining that the first command is a command that affects the system.

15. The information processing apparatus as set forth in claim 11, wherein the determining comprises:

determining whether or not a command whose command body is identical to a command body of the first command and having a parameter whose similarity with a parameter of the first command is equal to or greater than a predetermined value has been extracted.

* * * * *